United States Patent
Zeryck et al.

(10) Patent No.: US 8,549,224 B1
(45) Date of Patent: Oct. 1, 2013

(54) MIGRATION ANALYZER FOR HARDWARE-BASED STORAGE TIERING

(75) Inventors: David Zeryck, Portland, OR (US); Oufei Zhao, Needham, MA (US); Weijing Song, Acton, MA (US); Wolfgang Klinger, Whitinsville, MA (US); John Freeman, Northbridge, MA (US); Daniel Rice, Sturbridge, MA (US)

(73) Assignee: EMC Corporation, Hopkinton, MA (US)

( * ) Notice: Subject to any disclaimer, the term of this patent is extended or adjusted under 35 U.S.C. 154(b) by 858 days.

(21) Appl. No.: 12/639,469

(22) Filed: Dec. 16, 2009

(51) Int. Cl.
*G06F 12/00* (2006.01)

(52) U.S. Cl.
USPC .................................. 711/114; 711/E12.069

(58) Field of Classification Search
USPC ......................................................... 711/114
See application file for complete search history.

(56) References Cited

U.S. PATENT DOCUMENTS

| 7,529,887 B1* | 5/2009 | Haase et al. .................. 711/114 |
| 2009/0287887 A1* | 11/2009 | Matsuki et al. ............... 711/154 |

OTHER PUBLICATIONS

"EMC Delivers Next Generation of Enterprise Flash Drives," Press Release, printed from: http://www.emc.com/about/news/press/2009/20090318-04.htm, Nov. 11, 2009.

* cited by examiner

*Primary Examiner* — Reginald Bragdon
*Assistant Examiner* — Hamdy S Ahmed
(74) *Attorney, Agent, or Firm* — BainwoodHaung

(57) ABSTRACT

In an analyzer device, a method for identifying a logical unit (LUN) of a data storage system as a candidate for migration to a second storage group is presented. The method includes receiving, by the analyzer device, a set of data associated with activity of the LUN of a first storage group, comparing, by the analyzer device, a performance metric value of a performance metric of the set of data, associated with the LUN, to a performance metric threshold associated with the performance metric, and when the performance metric value corresponds to the performance metric threshold, categorizing, by the analyzer device, the LUN as a candidate for storage on the second storage group, the second storage group distinct from the first storage group and having a disk type different from that of the first storage group.

21 Claims, 4 Drawing Sheets

MIGRATION ANALYZER FOR HARDWARE-BASED STORAGE TIERING

BACKGROUND

A typical data storage system stores and retrieves data for one or more external host devices. Conventional data storage systems typically include a storage processor and an array of disk drives electrically coupled to the storage processor. The storage processor includes one or more ports, such as Fibre Channel ports, that allow the host devices to connect to the storage processor and is typically configured to perform load and store operations on the array of disk drives on behalf of the host devices.

In conventional storage systems, such as Fibre Channel storage systems, the storage processor is configured to monitor performance data related to Logical Units (LUNs) which are serviced by the array of disk drives. Within the storage system, disk drives are grouped in discrete sets called RAID Groups or Storage Pools. A LUN is serviced by a particular RAID group or Storage Pool. The essential characteristics of disk groups are defined by type and size of the drive and these characteristics determine the capacity and performance potential of the RAID group or Storage Pool. For this design, the disk type used in the RAID Group or Storage Pool and its inherent performance potential is integral to the essence of the design. For example, the storage processor monitors the disk utilization and LUN utilization associated with the set of LUNs serviced by the system.

As a result of such monitoring, the storage processor generates a report to provide a system operator with an overview of the performance of the storage system. For example, as part of the CLARiiON CX4 system, produced by EMC Corporation of Hopkinton, Mass., the storage processor generates a Navisphere Analyzer archive (NAR) that includes performance information related to the system's LUNs, cache state and RAID groups. In order to optimize operation of the array of disk drives, the system operator can review the performance information in the NAR report and make decisions as to the migration of certain data or LUNs to different RAID Groups or Storage Pools serviced by the data storage system based upon the relative usage of the LUNs, disk utilization and cache state.

SUMMARY

The report generated by the storage processor allows the system operator to identify particular LUNs for migration from their current RAID group to a different discrete RAID Group or storage pool. However, conventional storage systems do not include search or comparator operators to assist system operators to apply relatively sophisticated filters to the report data. Accordingly, review of the report is performed manually by the system operator and the task of identifying candidate LUNs that fit particular criteria out of the relatively large number of LUNs in a conventional storage system (e.g., up to 4096) can take hours. Additionally, in a manual review, analysis and interpretation of the report can be prone to human errors. For example, in order to properly analyze the report, the system operator is required to have an expert level knowledge of the optimal I/O profile for each class of disk drives within the array, including storage system interactions. Accordingly, based upon potentially inadequate knowledge of the disk drive profiles, the system operator can potentially analyze the report improperly and misidentify particular LUNs for migration from their current RAID group to a different discrete RAID Group or Storage Pool.

Furthermore, in conventional storage systems, the migration of selected LUNs from their current RAID group to a different discrete RAID Group or Storage Pool can suffer from a variety of deficiencies. For example, when the system operator has identified particular LUNs as candidates for migration to a different discrete RAID Group or Storage Pool, the system operator manually controls and monitors the migration of the selected LUNs to a different discrete RAID Group or Storage Pool. Accordingly, because the migration process requires administrative attention until completed, migration of LUNs to a different discrete RAID Group or Storage Pool is a time consuming and costly process.

By contrast to conventional analysis techniques, embodiments of the present invention relate to an analyzer device configured to analyze a performance archive file or report for a given a storage system. During analysis of one or more performance metrics included in the report, the analyzer device identifies LUNs of the storage system that can benefit performance-wise by migration from the LUNs' current RAID group or Storage Pool within the system to a different, discrete RAID Group or Storage Pool within that storage system. For example, the analyzer device can identify LUN candidates that achieve substantial performance improvements by moving the candidates to Enterprise Flash Drives. The analyzer device can also identify LUN candidates that reduce cost while maintaining acceptable performance by moving the candidates to Serial Advanced Technology Attachment (SATA) drives. The analyzer device can then generate an editable file which, after review by a system operator, is used by the analyzer device to automatically migrate the LUN candidates to their identified destination RAID group or Storage Pool that includes the desired disk drive type. Accordingly, the analyzer device reduces the amount of time required to perform a conventional report analysis, minimizes errors in misidentifying particular LUNs for migration, and relieves the system operator from having to oversee migration of multiple LUNs.

In one arrangement, embodiments of the invention relate to a method for identifying a logical unit (LUN) of a data storage system as a candidate for migration from a first storage group (e.g., a first RAID Group or Storage Pool) to a second storage group (e.g., second RAID Groups or Storage Pools). The method includes receiving, by an analyzer device, a set of data associated with activity of the LUN of the data storage system, comparing, by the analyzer device, a performance metric value of a performance metric of the set of data, associated with the LUN, to a performance metric threshold associated with the performance metric, and when the performance metric value corresponds to the performance metric threshold, categorizing, by the analyzer device, the LUN as a candidate for storage on the second storage group, the second storage group distinct from the first storage group.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to an analyzer device configured to analyze a performance archive file or report for a given a storage system. During analysis of one or more performance metrics included in the report, the analyzer device identifies LUNs of the storage system that can benefit performance-wise by migration from the LUNs' current RAID group or Storage Pool within the system to a different discrete RAID Group or Storage Pool within that storage system. For example, the analyzer device can identify LUN candidates that achieve substantial performance improvements by moving the candidates to Enterprise Flash Drives. The analyzer device can also identify LUN candidates that reduce cost while maintaining acceptable performance by moving the candidates to Serial Advanced Technology Attachment (SATA) drives. The analyzer device can then generate an editable file which, after review by a system operator, is used by the analyzer device to automatically migrate the LUN candidates to their identified destination RAID group or Storage Pool that includes the desired disk drive type. Accordingly, the analyzer device reduces the amount of time required to perform a conventional report analysis, minimizes errors in misidentifying particular LUNs for migration, and relieves the system operator from having to oversee migration of multiple LUNs.

Figure 1:
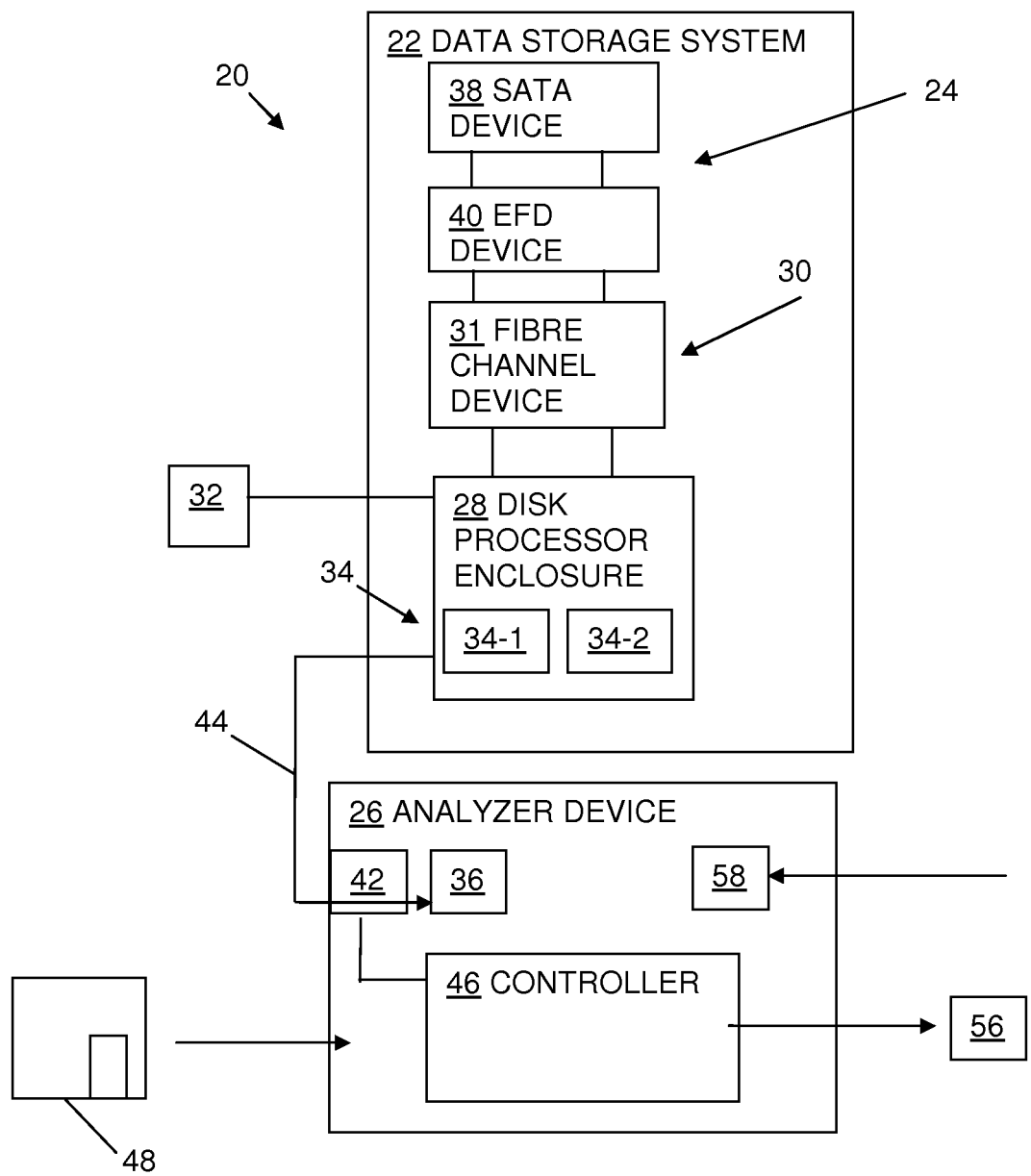
FIG. 1 illustrates a schematic representation of a data storage system having an analyzer device, according to one embodiment.

FIG. 1 illustrates an example arrangement of a data storage environment 20, such as used by an enterprise. As shown, the data storage environment 20 includes a data storage system 22 and an analyzer device 26 disposed in electrical communication with the data storage system 22.

The data storage system 22, in one arrangement, includes a disk processor enclosure 28, a first storage group 30 such as a first set of RAID Groups or Storage Pools disposed in electrical communication with the disk processor enclosure 28, and a second storage group 24 such as a second, discrete RAID Groups or Storage Pools disposed in electrical communication with the disk processor enclosure 28. The first storage group 30 can include an array of magnetic memory units. For example, the first storage group 30 includes several disk drives operable to store data received from a host device 32 or to provide data requested from the host device 32. While the disk drives can be identified in a variety of ways, in one arrangement, any number of the disk drives of the array, a portion of a particular disk drive of the array, or one or more virtual hard disk partitions, is identified within the data storage system 22 by a logical unit number (LUN).

The disk processor enclosure 28 includes one or more controllers or storage processors 34-1, 34-2 (collectively referred to as storage processor 34) configured to control certain functions of the data storage system 22. For example, the storage processor 34 is configured to perform load and store operations on the first storage group 30 on behalf of a host device. The storage processor 34 is configured to monitor disk utilization and logical unit (LUN) utilization associated with the memory units of the first storage group 30. As a result of such monitoring, the storage processor 34 generates a report 36 to provide a system operator with an overview of the performance of the array of disk drives. For example, as part of the CLARiiON CX4 system, produced by EMC Corporation of Hopkinton, Mass., the storage processor generates a Navisphere Analyzer archive (NAR) that includes performance information related to first storage group 30 (e.g., the first set of RAID Groups or Storage Pools) of the data storage system 22. While the report 36 can include a variety of performance information, in one arrangement, the report includes information regarding, LUN utilization, Disk Utilization, LUN Average Busy Queue Length (ABQL), Disk ABQL, LUN Read Size, LUN Write Size, LUN ratio of reads to writes, LUN Read Cache Hit Ratio, LUN Response Time, Disk Write size, LUN Full Stripe Writes/s, and LUN Write throughput.

The second storage group 24 (e.g., the discrete RAID Groups or Disk Pools) is configured to receive and store particular LUNs from the first storage group 30, based upon user selection of the particular LUNs from the report 36. In use, the second storage group 24 optimizes cost and/or performance aspects related to the selected LUNs, relative to the cost and performance aspects of the data storage system 22. For example, in one arrangement the second storage group 24 includes Enterprise Flash Drive (EFD) devices or Solid State Disks (SSD) 40 disposed in electrical communication with the disk processor enclosure 28. In the case where the first storage group 30 is configured as Fibre Channel RAID Groups or Disk Pools 31, the LUNs of the first storage group 30 are conventionally characterized by a relatively high performance requirement, relatively moderate storage capacities and, a relatively moderate cost per disk, thereby resulting in a relatively moderate cost per gigabyte of storage. By comparison to the Fibre Channel RAID Groups and Disk Pools 31, EFD RAID Groups and Disk Pools 40 are characterized by a relatively high cost per unit, thereby resulting in a relatively high cost per gigabyte of storage. However, the EFD RAID Groups and Disk Pools 40 include a relatively higher performance characteristic relative to the Fibre Channel RAID Groups and Disk Pools 31. Based upon the performance characteristic, for a Fibre Channel disk pool 31 to provide comparable performance to the EFD disk pool 40, the Fibre Channel disk pool 31 would cost more than the EFD disk pool 40.

The analyzer device 26, such as a computerized device, is disposed in electrical communication with the data storage system 22, through a communications interface 42, by way of a cable 44 or by way of a network connection, such as a remote network connection. The analyzer device 26 includes a controller 46, such as a memory and a processor, disposed in electrical communication with the communications interface 42. In one arrangement, the controller 46 stores a LUN identification application. The LUN identification application installs on the analyzer device 26 from a computer program product 48. In some arrangements, the computer program product 48 is available in a standard off-the-shelf form such as a shrink wrap package (e.g., CD-ROMs, diskettes, tapes, etc.). In other arrangements, the computer program product 48 is available in a different form, such downloadable online media. For example, the LUN identification application can be downloaded from a web server on the data storage system 22 when the analyzer device 26 is connected via a web browser. When performed on the controller 46 of the analyzer device 26, the LUN identification application causes the analyzer device 26 to identify a LUN of set of LUNs of the first storage group 30 as a candidate for migration to different, discrete RAID Groups or Storage Pools 24.

Figure 2:
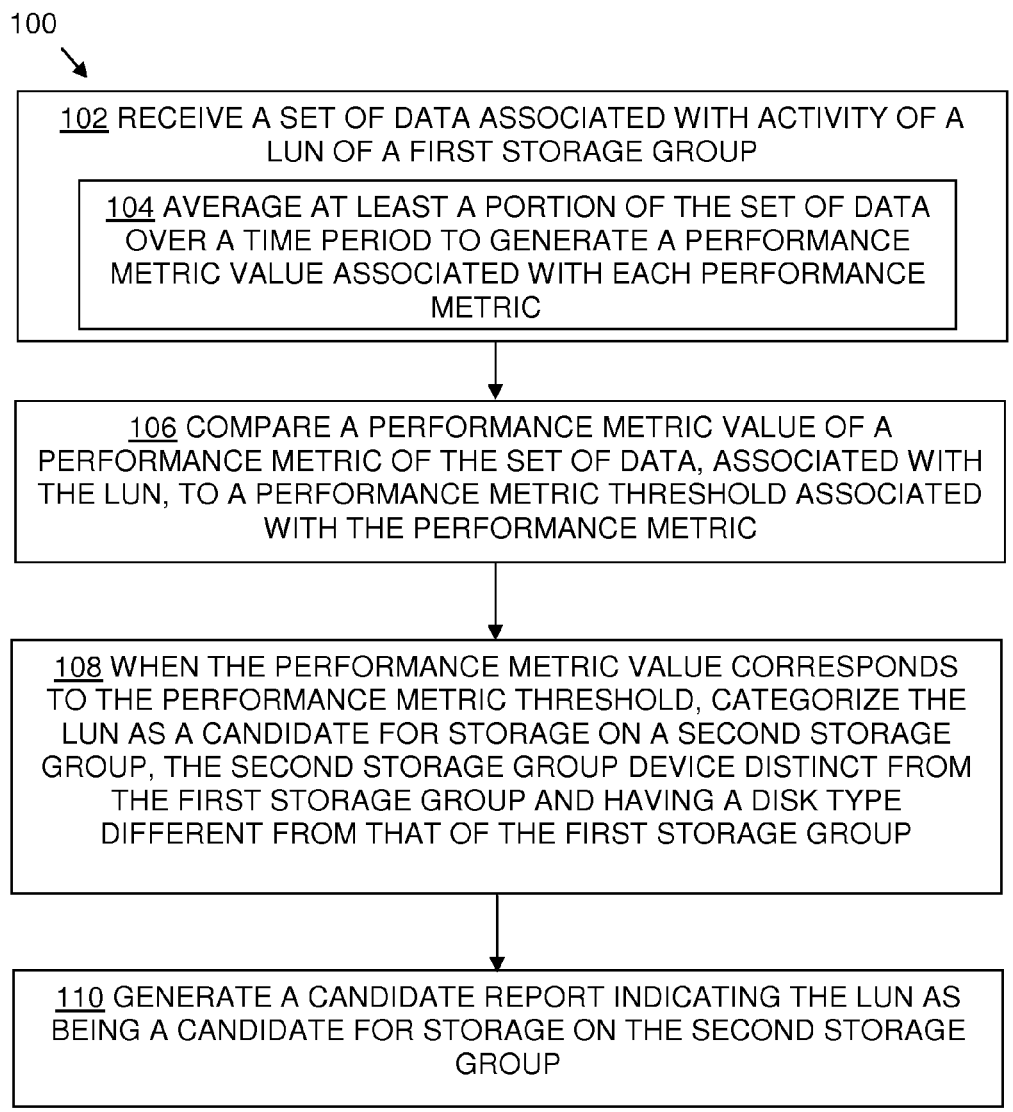
FIG. 2 is a flowchart that illustrates a procedure performed by the analyzer device of FIG. 1.

FIG. 2 is a flowchart 100 that illustrates a procedure performed by the analyzer device 26 when identifying a LUN of set of LUNs for identifying a logical unit (LUN) of a data storage system as a candidate for migration from a first storage group 30 (e.g., a first RAID Group or Storage Pool) to a second storage group 24 (e.g., second RAID Groups or Storage Pools). With such identification, the analyzer device 26 provides a system operator with suggestions for LUNs that can benefit from a performance and/or cost perspective by migration from the first storage group 30 to the second storage group 24.

In step 102, the analyzer device 26 receives a set of data associated with activity of a LUN of a first storage group 30. For example, as indicated above and with reference to FIG. 1, storage processor 34 monitors each LUN of the first storage group 30 over a given time duration for certain performance metrics, such as LUN utilization, Disk Utilization, LUN Average Busy Queue Length (ABQL), Disk ABQL, LUN Read Size, LUN Write Size, LUN ratio of reads to writes, LUN Read Cache Hit Ratio, LUN Response Time, Disk Write size, LUN Full Stripe Writes/s, and LUN Write throughput.

During the time duration, the storage processor 34 stores, at a given rate, each performance metric for each LUN as the set of data in the report 36. At the end of the time duration, the storage processor 34 transmits the report 36 to the analyzer device 26 for analysis.

Figure 3:
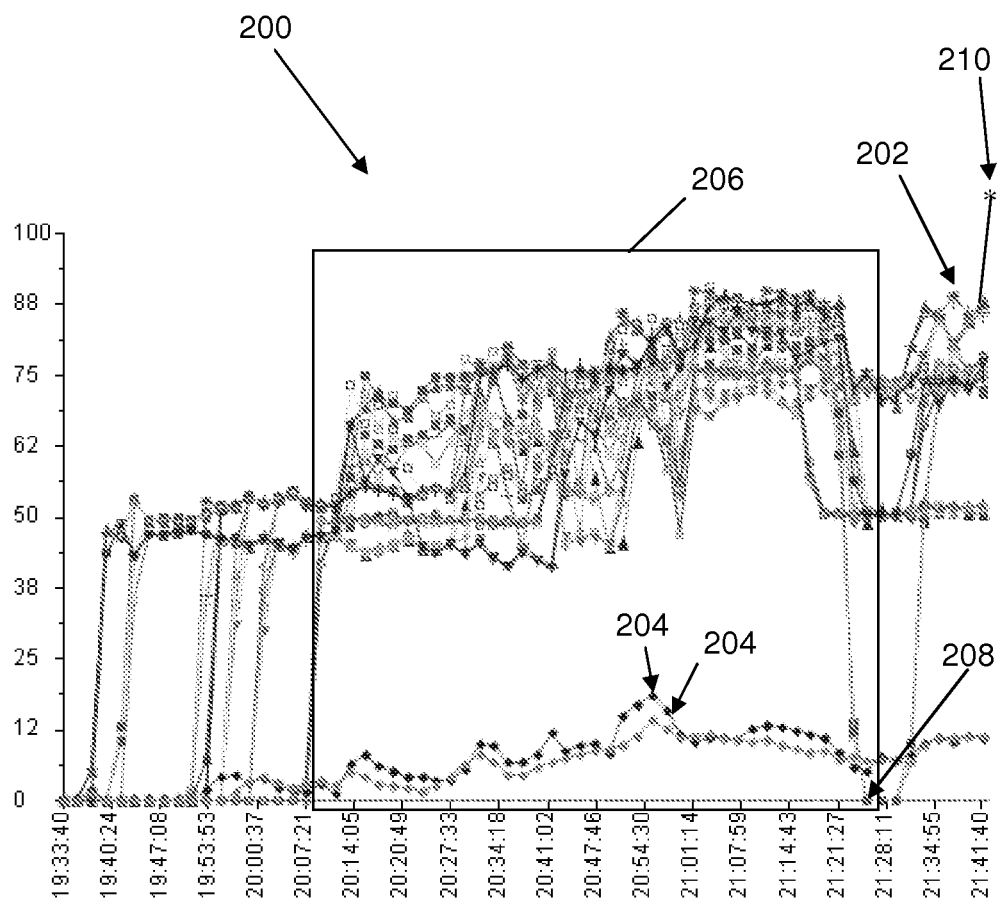
FIG. 3 is a graph that illustrates a LUN utilization performance metric for each LUN of a set of LUNs associated with the disc enclosures of the of a data storage system of FIG. 1.

Returning to FIG. 2 and as indicated in step 104, in response to receiving the set of data, in one arrangement, the analyzer device 26 averages at least a portion of the set of data over a time period to generate a performance metric value associated with each performance metric. For example, FIG. 3 is a graph 200 that illustrates a LUN utilization performance metric 202 for each LUN, associated with the Fibre Channel RAID Groups or Disk Pools 31, over a given time duration. In one arrangement, when averaging the LUN utilization performance metric 202 for each LUN, the analyzer device 26 sums each of the entries 204 of the LUN utilization performance metric and divides by the total number of entries 204 to generate the performance metric value (i.e., the average LUN utilization performance metric value) associated with each LUN.

In one arrangement, the analyzer device 26 is configured to average a subset of the data contained in the report 36 to generate an average performance metric value. For example, the analyzer device 26 can be configured to perform the averaging and analysis on the performance metrics collected during a particular period of time, such as during a period of relatively peak usage. In this example, and with reference to FIG. 3, the analyzer device 26 reviews the performance metrics, such as the LUN utilization performance metric, for each LUN of the first storage group 30 and focuses on a time period 206 during a period of relatively peak utilization for all LUNs. The analyzer device 26 then averages each LUN utilization performance metric during the time period 206 to generate an average performance metric value for each LUN.

In another arrangement, prior to averaging performance metrics, the analyzer device 26 is configured to calibrate at least a portion of the data of the data set to remove data having a value that falls below a valid data value threshold. For example, if a LUN has no activity for a relatively long period over the time duration, the storage processor 34 can generate, for one or more performance metrics associated with the LUN, an entry having a performance metric value substantially equal to zero 208 (termed zero-values herein). In order to minimize the effect of these zero values on the overall average performance metric value for a particular performance metric for the LUNs, the analyzer device 26 detects the presence of the zero-values for a given performance metric (i.e., values that fall below a particular threshold) and removes the zero-value from the performance metric data set for a each LUN prior to averaging the entries for the performance metric.

In another arrangement, prior to averaging performance metrics, the analyzer device 26 is configured to calibrate at least a portion of the data of the data set to remove data having a value that exceeds a valid data value threshold. For example, during operation, the storage processor 34 can erroneously generate a LUN utilization performance metric value 210 that indicates the LUN as having greater than 100% utilization. The analyzer device 26 compares this value 210 against a threshold maximum threshold value (e.g., indicating the LUN as having a maximum of 100% utilization). As a result of the comparison, the analyzer device 26 can detect the value 210 as exceeding the threshold and can remove the value 210 from the data set, prior to averaging the data, to minimize the influence of the erroneous value 210 on the remaining LUN utilization performance metric data.

Returning to FIG. 2, in step 106, the analyzer device 26 compares a performance metric value of a performance metric of the set of data, associated with the LUN, to a performance metric threshold associated with the performance metric. In one arrangement, during operation, the analyzer device 26 compares each average performance metric value of each LUN with a corresponding performance metric threshold value. For example, taking the LUN utilization performance metric as a representative performance metric, during the comparison process, the analyzer device 26 compares the average value of the LUN utilization performance metric of each LUN with the threshold LUN utilization performance metric. For example, assume that analyzer device 26 is configured such that, for the threshold LUN utilization performance metric, an average 70% LUN utilization level is the minimum utilization level for categorizing a LUN as a candidate for migration to a second storage group 24 (i.e. a different discrete RAID Group or Storage Pool). Further assume that a first LUN has an average LUN utilization performance metric of 90% and a second LUN has an average LUN utilization performance metric of 60%. Based upon a comparison of the average LUN utilization levels of the first and second LUNs with the threshold LUN utilization performance metric, the analyzer device 26 detects the first LUN as having an average LUN utilization that exceeds the threshold LUN utilization performance metric and detects the second LUN as having an average LUN utilization that falls below the threshold LUN utilization performance metric.

In step 108, when the performance metric value corresponds to the performance metric threshold, the analyzer device 26 categorizes the LUN as a candidate for storage on a second storage group 24, the second storage group 24 distinct from the first storage group 30 and having a disk type different from that of the first storage group 30. For example, with reference to the above-described comparison, based upon a comparison of the average LUN utilization levels of the first and second LUNs with the threshold LUN utilization performance metric, the analyzer device 26 detects the first LUN as having an average LUN utilization that exceeds the threshold LUN utilization performance metric (i.e., corresponds to the performance metric threshold) and detects the second LUN as having an average LUN utilization that falls below the threshold LUN utilization performance metric. Accordingly, because the threshold LUN utilization performance metric of the first LUN exceeds threshold LUN utilization performance metric, the analyzer device 26 can categorize the first LUN as a candidate for migration to a different discrete RAID Group or Storage Pool such as the EFD devices 40. The analyzer device 26 discards the second LUN as a candidate when the threshold LUN utilization performance metric of the second LUN does not corresponds to the performance metric threshold.

In step 110, the analyzer device 26 generates a candidate report indicating the LUN as being a candidate for storage on a second storage group 24. For example, with reference to FIG. 1, once the analyzer device 26 has identified particular LUNs of the data storage system 22 as candidates that would achieve substantial performance and/or cost improvements if moved to a different discrete RAID Group or Storage Pool, the analyzer device 26 includes the list of candidates as part of the candidate report 56, such as an XML report 56. While the report 56 includes a listing of LUN candidates, in one arrangement, the report 56 includes additional information that provides the system operator with an indication as to the performance of the data storage system 22 during a given time duration. For example, the report 56 can include data source information with respect to the data storage system 22, performance criteria thresholds (e.g., the threshold LUN utilization performance metric, the threshold ABQL performance metric, and the threshold LUN Response Time performance metric) used during the comparison, and storage processor performance overview information. The report 56 is a user-editable but machine-readable Comma Separated Value (CSV) file which contains instructions for the migration processor. The user can edit the CSV file to include the internal identifier of the target RAID Group or Storage Pool designated to receive each LUN selected for migration.

Based upon the report 56, the system operator can determine if the migration of one or more of the candidate LUNs to the second storage group 24 (i.e., a different discrete RAID Group or Storage Pool) is appropriate. For example, based upon an analysis of the report 56, the system operator can determine if migration of the LUNs to the second storage group 24 is appropriate based upon economic and performance-related criteria. If based upon the system operator's analysis, migration of one or more candidate LUNs is appropriate, in one arrangement, the system operator revises the CSV report 56 to either accept or reject certain LUN candidates for migration to the second storage group 24 (i.e., to a different discrete RAID Group or Storage Pool) and also designates the internal identifier of the target RAID Group or Storage Pool. The operator then provides the revised CSV report as migration instructions 58 to the analyzer device 26 for processing. As will be described in detail below, and with respect to FIG. 4, the analyzer device 26 utilizes the migration instructions 58 to automatically transfer the selected LUNs to the second storage group 24 (i.e., a different discrete RAID Group or Storage Pool).

Figure 4:
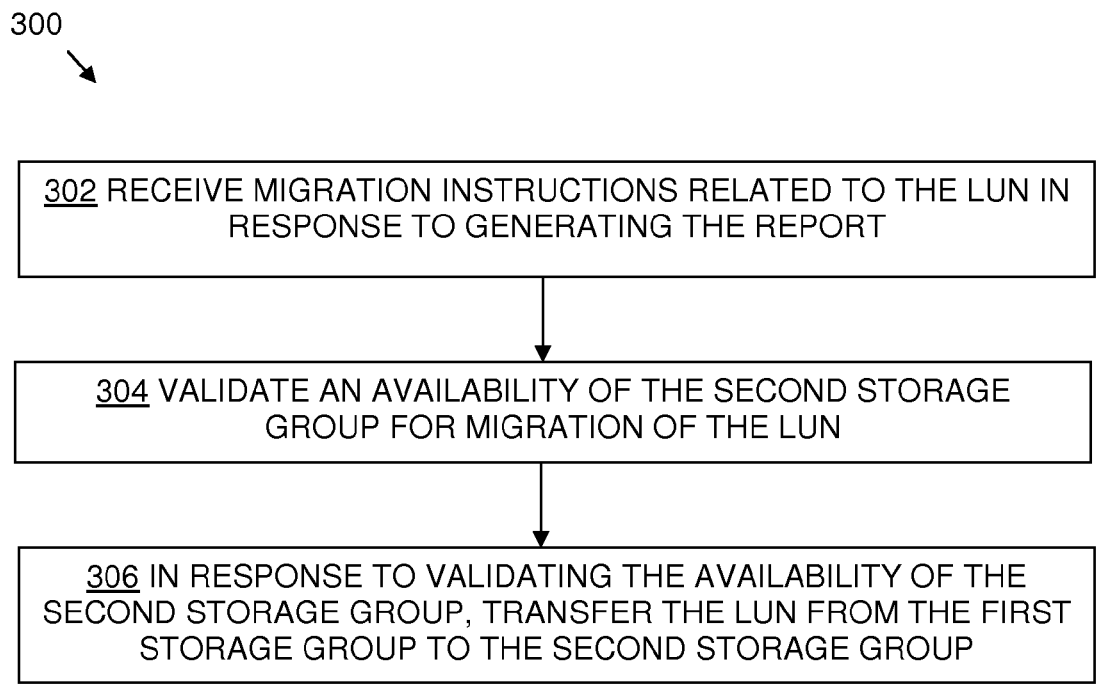
FIG. 4 is a flowchart that illustrates a procedure performed by the analyzer device of FIG. 1.

FIG. 4 is a flowchart 300 that illustrates a procedure performed by the analyzer device 26 when migrating a LUN from the data storage system 22 to the second storage group 24.

In step 302, the analyzer device 26 receives migration instructions 58 related to the LUN in response to generating the report 56. For example, as indicated above, the analyzer device 26 receives the migration instructions 58 from a system operator where the migration instructions 58 include a listing of particular LUNs that the system operator has selected from the CSV report 56 for migration to the second storage group 24.

In step 304, the analyzer device 26 validates an availability of the second storage group 24 (i.e., a different discrete RAID Group or Storage Pool) for migration of the LUN. For example, in one arrangement, prior to moving the selected LUNs to the second storage group 24, the analyzer device 26 detects an amount of storage space available on the second storage group 24 and compares the available space to the storage requirements of the selected LUNs. If the storage requirement of the selected LUNs is larger than the storage space available on the second storage group 24, the analyzer device 26 generates a warning message and forwards the message to the system operator. However, if the storage requirement of the selected LUNs is less than the storage space available on the second storage group 24, the analyzer device 26, the analyzer device validates the second storage group 24 as being available to store the selected LUNs.

In another arrangement, the analyzer device 26 reviews functionality criteria associated with the second storage group 24 (i.e., the designated target RAID Group or Storage Pool) to detect a conflict to detect a conflict between the type of disk drives included in the RAID Group or Storage Pool with the target desired for the selected LUNs. If the analyzer device 26 detects a conflict between a type of disk drives included in the target RAID Group or Storage Pool 24 and the target disk type desired for the selected LUNs, the analyzer device 26 generates a warning message and forwards the message to the system operator. However, if the analyzer device 26 detects no conflict between the type of disk drives included in the target RAID Group or Storage Pool 24 and the target desired for the selected LUNs, the analyzer device 26 validates the RAID Group or Storage Pool 24 designated in the CSV file as being available to store the selected LUNs.

In step 306, in response to validating the availability of the second storage group, the analyzer device 26 transfers the LUN from the first storage group 30 to the second storage group 24. For example, in one arrangement, the analyzer device 26 accesses the first storage group 30 and for the selected LUNs identified in the migration instructions 58 facilitates migration of the selected LUNs from the first storage group 30 to the second storage group 24 (e.g., from the original RAID Group or Storage Pool to the target RAID Group or Storage Pool). While the analyzer device 26 conducts the migration automatically, without input from the system operator and without the need for monitoring by the system operator, in one arrangement, the system operator can stop the migration of the selected LUNs to the second storage group 24 at any time during the transfer. For example, system operator can provide a stop migration instruction to the analyzer device 26 that, in response, stops the transfer of the selected LUNs from the first storage group to the second storage group 24.

As indicated by the above description, the analyzer device 26 reduces the amount of time required by a system operator perform a conventional report analysis and minimizes errors in misidentifying particular LUNs for migration. Additionally, because the analyzer device 26 relieves the system operator from having to oversee migration of multiple LUNs to the second storage group, the analyzer device 26 provides a time and cost savings to an enterprise that utilizes the analyzer device 26.

As indicated above, the second storage group 24 (e.g., the discrete RAID Group or Storage Pool) can be configured to optimize both cost and performance aspects related to the selected LUNs, relative to the cost and performance aspects of the first storage group 30 (i.e., the original RAID Group or Storage Pool).

For example, as indicated above, the data storage system 22 includes as part of the first storage group 30 a Fibre Channel (FC) device 31 and includes as part of the second storage group the EFD device 40 disposed in electrical communication with the disk processor enclosure 28. In one arrangement, in addition to the first storage group 30, the data storage system 22 includes as the second storage group 24 both the EFD device 40 as well as a Serial Advanced Technology Attachment (SATA) device 38 disposed in electrical communication with the disk processor enclosure 28. The conventional SATA device 38, while typically characterized as having a relatively low performance requirement, includes a relatively high storage capacity per disk and a relatively low cost per disk, resulting in a relatively low cost per gigabyte of storage compared to a Fibre Channel data storage system. By including the SATA device 38 and the EFD device 40 as part of the second storage group 24, the second storage group (i.e., the discrete RAID Groups and Storage Pools) 24 can provide, within a single storage system 22, selected LUNs with varying levels of performance at an acceptable cost per hardware unit and at an acceptable cost per storage unit.

With both the EFD device 40 and SATA device 38 available as part of the second storage group 24, during operation, the analyzer device 26 reviews and categorize each LUN as being a candidate for migration to the EFD device 40 or as being a candidate for migration to the SATA device 38 based upon certain performance metrics, such as LUN utilization, Disk Utilization, LUN Average Busy Queue Length (ABQL), Disk ABQL, LUN Read Size, LUN Write Size, LUN ratio of reads to writes, LUN Read Cache Hit Ratio, LUN Response Time, Disk Write size, LUN Full Stripe Writes/s, and LUN Write throughput. The following provides an example of an analysis performed by the analyzer device 26 on the performance metrics when categorizing each LUN as being a candidate for migration to the EFD device 40 or as being a candidate for migration to the SATA device 38.

In one arrangement, in order for the analyzer device 26 to classify a LUN as a candidate for migration to the EFD device 40, the analyzer device 26 detects if certain performance metrics associated with each LUN meet corresponding EFD performance metric thresholds. For example, the analyzer device 26 detects a relationship between the Disk Utilization performance metric and a Disk Utilization performance metric threshold, such as a threshold of 70%, indicating a relatively busy disk. The analyzer device 26 also detects if the LUN utilization performance metric exceeds a LUN utilization performance metric threshold, such as a threshold of 70%, indicating a relatively busy LUN. The analyzer device 26 also detects if the LUN ABQL metric exceeds a LUN ABQL performance metric threshold, such as a threshold of 5. The analyzer device 26 further detects if the LUN Response Time performance metric exceeds a LUN Response Time performance metric threshold, such as a threshold of 10 ms. The analyzer device 26 further detects if the LUN ratio of reads to writes performance metric falls within particular threshold ranges based upon certain write sizes (i.e., under certain fuzzy logic conditions), such as when the ratio is greater than or equal to 60:40 if the write size is less than or equal to 16 kilobytes (KB), when the ratio is greater than or equal to 50:50 if the write the size is less than or equal to 8 KB, or when the ratio is greater than or equal to 95:5 if the write size is less than or equal to 64 KB. The analyzer device 26 further detects if the LUN Read Size performance metric is less than or equal to a LUN Read Size performance metric threshold, such as a threshold of 32 KB, because relatively larger I/O is more challenging for the EFD device 40 to process. The analyzer device 26 also further detects if the LUN Read Cache Hit Ratio is less than a LUN Read Cache Hit Ratio performance metric threshold, such as a threshold of 50%.

Based upon the above-referenced procedure, the analyzer device 26 is configured to detect if a given LUN is a candidate for migration to the EFD device 40 and categorizes the relative level of benefit provided to the LUN (e.g., highest, strong, possible) if the LUN were to be migrated to the EFD device 40.

For example, in the case where the analyzer device 26 detects that the Disk Utilization performance metric is greater than 70% for at least one disk, the LUN utilization performance metric is greater than 70%, the LUN ABQL performance metric is greater than 5, the LUN Response time performance metric is greater than 10 ms, LUN ratio of reads to writes performance metric falls within a range that is greater than or equal to a ratio of 60:40 if the write size is less than or equal to 16 KB, falls within a range that is greater than or equal to a ratio of 50:50 if the write size is less than or equal to 8 KB, or falls within a range that is greater than or equal to a ratio of 95:5 if write size is less than or equal to 64 KB, the LUN Read size performance metric is less than or equal to 32 KB, LUN Read Cache Hit Ratio performance metric is less than 50%, the analyzer device 26 classifies the LUN as a candidate for migration to the EFD device 40 and categorizes the LUN as a first class (e.g., highest) candidate. Such categorization indicates that the LUNs meet all of the EFD criteria and are associated with busy disks and therefore would benefit by moving to EFD with lower response time.

In the case where the analyzer device 26 detects that the Disk Utilization performance metric is less than or equal to 70% for all disks, the LUN utilization performance metric is greater than 70%, the LUN ABQL performance metric is greater than 5, the LUN Response time performance metric is greater than 10 ms, LUN ratio of reads to writes performance metric falls within a range that is greater than or equal to a ratio of 60:40 if the write size is less than or equal to 16 KB, falls within a range that is greater than or equal to a ratio of 50:50 if the write size is less than or equal to 8 KB, or falls within a range that is greater than or equal to a ratio of 95:5 if write size is less than or equal to 64 KB, the LUN Read size performance metric is less than or equal to 32 KB, LUN Read Cache Hit Ratio performance metric is less than 50%, the analyzer device 26 classifies the LUN as a candidate for migration to the EFD device 40 and categorizes the LUN as a second class (e.g., strong) candidate. Such categorization indicates that the LUNs meet all of the EFD criteria but are not associated with busy disks.

In the case where a LUNs does not fall into above two categories and the analyzer device 26 detects that the LUN utilization performance metric is greater than 70%, the LUN ABQL performance metric is greater than 5, and the LUN Read Cache Hit Ratio performance metric is less than 50%, the analyzer device 26 classifies the LUN as a candidate for migration to the EFD device 40 and categorizes the LUN as a third class (e.g., possible) candidate. Such categorization indicates that the LUN is relatively busy, but that the benefits of migrating the LUN to an EFD RAID Group or Storage Pool of the second storage group 24 may not be as great as in the first class category.

Once completed with the analysis of a LUN as a candidate for migration to the EFD device 40, the analyzer device 26 detects if certain performance metrics associated with each remaining LUN meet corresponding SATA performance metric thresholds, either as a random candidate or as a sequential candidate. For example, the analyzer device 26 detects if certain LUNs associated with the data storage system 22 can be categorized as a SATA random candidate or as a SATA sequential candidate. For example, a SATA random candidate LUN has a relatively low Average Busy Queue Length, which signifies a relatively low level of concurrent usage and requires a relatively low utilization of the drives hosting the LUN. A SATA sequential candidate LUN can have a relatively higher disk utilization rate compared to a SATA random candidate and the write size of a SATA sequential candidate LUN is required to be fairly large.

In one arrangement, in order for the analyzer device 26 to classify a LUN as a candidate for migration to the SATA device 38, the analyzer device 26 detects if certain performance metrics associated with each LUN meet corresponding SATA performance metric thresholds. For example, to detect that a LUN is a random candidate for the SATA device 38, the analyzer device 26 detects that the Disk Utilization performance metric is less than 30% for all disks, that the Disk ABQL performance metric is less than 2 for all disks, and the LUN Utilization performance metric is less than 30%. Additionally, to detect that a LUN is a random candidate the analyzer device 26 must detect one of the following conditions. In one arrangement, the analyzed device 26 must detect that, for the LUN, the LUN ABQL performance metric is less than 4, the LUN ratio of reads to writes is greater than or equal to 60:40, and the LUN Write size performance metric is less than or equal to 64 KB. Alternately, the analyzer device 26 must detect that the LUN ABQL performance metric is less than 2 and either that the LUN Write Size performance metric is greater than 512 KB or that the LUN Read Size performance metric is greater than 512 KB. Additionally, to detect that a LUN is a sequential candidate for the SATA device 38, the analyzer device 26 detects that the Disk Utilization performance metric is less than 70% for all disks and the LUN Utilization performance metric is less than 70%. Additionally, to detect that a LUN is a sequential candidate the analyzer device 26 must detect one of the following conditions. In one arrangement, the analyzed device 26 must detect that, for the LUN, the LUN Write size performance metric is greater than or equal to 256 KB and that (Disk Write size/64 KB)*LUN Full Stripe Write/s>=0.98*LUN Write Throughput. Alternately, the analyzer device must detect that the LUN Write size performance metric is less than 256 KB and the Disk Write size performance metric is greater than or equal to 2*the LUN Write size performance metric for all disks. Alternately, the analyzer device must detect that the LUN Write size performance metric is less than 256 KB, the LUN Read Throughput/Total Throughput is greater than or equal to 80%, and the LUN Read Cache hit ratio is greater than 80%.

In the case where the analyzer device 26 detects a LUN as a candidate for migration to the EFD device 40, the analyzer device 26 provides, to the system operator, the categorization of the LUN (e.g., highest, strong, possible) as part of the report 56. Additionally, in the case where the analyzer device detects a LUN as a candidate for migration to the SATA device 38, the analyzer device 26 includes the categorization of the LUN (SATA random candidate or SATA sequential candidate) as part of the report 56. The system operator can utilize the categorization information as a basis for a decision to migrate candidate LUNs to particular storage devices 38, 40 in the second storage group 24 (i.e., a different discrete RAID Group or Storage Pool).

The analyzer device 26, performs the above-referenced analysis in a hierarchical manner (i.e., on the set of performance metric values of the performance metrics of the set of data) to detect if a given LUN is a candidate for migration to the EFD device 40 or the SATA device 38. With such an analysis, the analyzer device 26 performs an interdependent comparison of the set of performance metric values to the corresponding set of performance metric thresholds. In the case where the analyzer device 26 detects that, based upon for a given LUN one of the performance metrics do not meet the corresponding performance metric threshold, first for migration to the EFD device 40 then for migration to the SATA device 38, the analyzer device 26 discards the LUN as a candidate for migration. Accordingly, the discarded LUN remains on the first storage group 30.

While various embodiments of the invention have been particularly shown and described, it will be understood by those skilled in the art that various changes in form and details may be made therein without departing from the spirit and scope of the invention as defined by the appended claims.

For example, as indicated above, in order for the analyzer device 26 to classify a LUN as a candidate for migration to the EFD device 40, the analyzer device 26 detects if certain performance metrics associated with each LUN meet corresponding EFD performance metric thresholds. As further indicated above, the analyzer device 26 detects if the Disk Utilization performance metric exceeds a Disk Utilization performance metric threshold, such as a threshold of 70%, if the LUN utilization performance metric exceeds a LUN utilization performance metric threshold, such as a threshold of 70%, if the LUN ABQL metric exceeds a LUN ABQL performance metric threshold, such as a threshold of 5, and if the LUN Response Time performance metric exceeds a LUN Response Time performance metric threshold, such as a threshold of 10 ms. In one arrangement, each of the Disk Utilization performance metric threshold, LUN utilization performance metric threshold, LUN ABQL performance metric threshold, and LUN Response Time performance metric threshold can be adjusted or defined by the system operator prior to the LUN classification performed by the analyzer device 26.

In one arrangement, when comparing the performance metric values of each of the LUNs to a performance metric threshold, there may be cases where a performance metric value for a LUN falls just outside of the performance metric threshold. In one arrangement, the analyzer device 26 is configured to apply fuzzy logic to the results of the comparison in order to either include or exclude a given LUN for consideration as a candidate for migration to the second storage group 24 (i.e., a different discrete RAID Group or Storage Pool).

As described above, in response to receiving the set of data, in one arrangement, the analyzer device 26 averages at least a portion of the set of data over a time period to generate a performance metric value associated with each performance metric. Such description is by way of example only. In one arrangement, in response to receiving the set of data the analyzer device 26 sums all of the nonzero entries in the set of data are summed and divided by the count to derive an average value. Then, the standard deviation of all nonzero entries is calculated and added to the average. The purpose of this is to catch objects which have intensely busy periods, but which are quiescent during a given time period.

As indicated above, the analyzer device 26 is configured to identifying a LUN of set of LUNs of a first storage group 30, such as a Fibre Channel device 31 as a candidate for migration to a second storage group, such as an EFD device 40 or a SATA device 38. Such description is by way of example only. In one arrangement, the analyzer device 26 is configured to identify a LUN associated with any of the devices 31, 40, 38 as a candidate for migration to any of the other devices 31, 40, 38. For example, the analyzed device can be configured to identifying a LUN the SATA device 38 as a candidate for migration to the Fibre Channel device 31.

As indicated above, FIG. 2 is a flowchart 100 that illustrates a procedure performed by the analyzer device 26 when identifying a LUN of set of LUNs for identifying a logical unit (LUN) of a data storage system as a candidate for migration from a first storage group 30 to a second storage group 24. It should be understood that identification and migration of a LUN includes the identification and migration of metaLUNs as well.

The invention claimed is:

1. A method for identifying a logical unit (LUN) of a set of LUNs of a first storage group of a data storage system as a candidate for migration to a second storage group of the data storage system, comprising:
   receiving, by an analyzer device, a set of data associated with activity of the LUN of the first storage group;
   comparing, by the analyzer device, a performance metric value of a performance metric of the set of data, associated with the LUN, to a performance metric threshold associated with the performance metric; and
   when the performance metric value corresponds to the performance metric threshold, categorizing, by the analyzer device, the LUN as a candidate for storage on the second storage group, the second storage group distinct from the first storage group and having a disk type different from that of the first storage group;
   wherein the method further comprises, in response to receiving the set of data associated with the activity of the LUN, averaging, by the analyzer device, at least a portion of the set of data over a time period to generate a performance metric value associated with each performance metric.

2. The method of claim 1, wherein averaging,
   comprising, in response to receiving the set of data associated with the activity of the LUN and prior to averaging the at least a portion of the set of data,
   calibrating, by the analyzer device, at least a portion of the data of the data set to remove data having a value that falls below a valid data value threshold.

3. The method of claim 1, comprising, in response to receiving the set of data associated with the activity of the LUN and prior to averaging the at least a portion of the set of data, calibrating, by the analyzer device, at least a portion of the data of the data set to remove data having a value that exceeds a valid data value threshold.

4. The method of claim 1, wherein categorizing, by the analyzer device, the LUN as a candidate for storage on the second storage group comprises categorizing, by the analyzer device, the LUN as a candidate for storage on an Enterprise Flash Drive (EFD) device.

5. The method of claim 4, wherein categorizing, by the analyzer device, the LUN as a candidate for storage on the EFD device comprises categorizing, by the analyzer device, the LUN as one of a first class candidate for storage on the EFD device, a second class candidate for storage on the EFD device, and a third class candidate for storage on the EFD device based upon relationships between a set of performance metric values and an associated set of performance metric thresholds, the first class candidate having a greater candidacy ranking than the second class candidate and the third class candidate and the second class candidate having a greater candidate ranking than the third class candidate.

6. The method of claim 1, wherein categorizing, by the analyzer device, the LUN as a candidate for storage on the second storage group comprises categorizing, by the analyzer device, the LUN as a candidate for storage on a Serial Advanced Technology Attachment (SATA) device.

7. The method of claim 6, wherein categorizing, by the analyzer device, the LUN as a candidate for storage on the SATA device comprising categorizing, by the analyzer device, the LUN as one of a random candidate for storage on the SATA device and a sequential candidate for storage on the SATA device based upon relationships between a set of performance metric values and an associated set of performance metric thresholds.

8. The method of claim 1, comprising generating, by the analyzer device, a candidate report indicating the LUN as being a candidate for storage on the second storage group.

9. The method of claim 8, comprising:
   receiving, by the analyzer device, migration instructions related to the LUN in response to generating the report;
   validating, by the analyzer device, an availability of the second storage group for migration of the LUN; and
   in response to validating the availability of the second storage group, transferring the LUN from the first storage group to the second storage group.

10. The method of claim 1, wherein comparing, by the analyzer device, the performance metric value of a performance metric of the set of data, associated with the LUN, to the performance metric threshold associated with the performance metric comprises comparing, by the analyzer device, a set of performance metric values of the performance metrics of the set of data, associated with the at least one LUN, to a set of performance metric thresholds associated with the performance metrics, the performance metrics of the set of performance metric values and the performance metric thresholds associated with the performance metrics being subject to interdependent comparison by the analyzer device.

11. The method of claim 1, wherein averaging, by the analyzer device, of at least a portion of the set of data over a time period to generate a performance metric value associated with each performance metric further includes generating an average for at least one performance metric selected from a set including LUN utilization, disk utilization, LUN average busy queue length (ABQL), disk ABQL, LUN read size, LUN write size, LUN ratio of reads to writes, LUN read cache hit ratio, LUN response time, disk write size LUN full stripe writes, and LUN write throughput.

12. An analyzer device, comprising:
   at least one communications interface; and
   a controller electrically coupled to the at least one communications interface wherein the controller is configured to:
   receive, via the at least one communications interface, a set of data associated with activity of a logical unit (LUN) of a set of LUNs of a first storage group;
   compare a performance metric value of a performance metric of the set of data, associated with the LUN, to a performance metric threshold associated with the performance metric; and
   when the performance metric value corresponds to the performance metric threshold, categorize the LUN as a candidate for storage on a second storage group, the second storage group distinct from the first storage group and having a disk type different from that of the first storage group;
   wherein the method further comprises, in response to receiving the set of data associated with the activity of the LUN, averaging, by the analyzer device, at least a portion of the set of data over a time period to generate a performance metric value associated with each performance metric.

13. The analyzer device of claim 12, wherein in response to receiving the set of data associated with the activity of the LUN and prior to averaging the at least a portion of the set of data, the controller is configured to calibrate at least a portion of the data of the data set to remove data having a value that falls below a valid data value threshold.

14. The analyzer device of claim 12, wherein in response to receiving the set of data associated with the activity of the LUN and prior to averaging the at least a portion of the set of data, the controller is configured to calibrate at least a portion of the data of the data set to remove data having a value that exceeds a valid data value threshold.

15. The analyzer device of claim 12, wherein when categorizing the LUN as a candidate for storage on the second storage group, the controller is configured to categorize the LUN as a candidate for storage on an Enterprise Flash Drive (EFD) device.

16. The analyzer device of claim 15, wherein when categorizing device, the LUN as a candidate for storage on the EFD device, the controller is configured to categorize the LUN as one of a first class candidate for storage on the EFD device, a second class candidate for storage on the EFD device, and a third class candidate for storage on the EFD device based upon relationships between a set of performance metric values and an associated set of performance metric thresholds, the first class candidate having a greater candidacy ranking than the second class candidate and the third class candidate and the second class candidate having a greater candidate ranking than the third class candidate.

17. The analyzer device of claim 12, wherein when categorizing the LUN as a candidate for storage on the second storage group, the controller is configured to categorize the LUN as a candidate for storage on a Serial Advanced Technology Attachment (SATA) device.

18. The analyzer device of claim 17, wherein when categorizing the LUN as a candidate for storage on the SATA device, the controller is configured to categorize the LUN as one of a random candidate for storage on the SATA device and a sequential candidate for storage on the SATA device based upon relationships between a set of performance metric values and an associated set of performance metric thresholds.

19. The analyzer device of claim 12, wherein the controller is configured to generate a candidate report indicating the LUN as being a candidate for storage on the second storage group.

20. The analyzer device of claim 19, wherein the controller is configured to:
    receive migration instructions related to the LUN in response to generating the report;
    validate an availability of the second storage group for migration of the LUN; and
    in response to validating the availability of the second storage group, transfer the LUN from the first storage group to the second storage group.

21. A computer program product having a non-transitory computer-readable storage medium including computer program logic encoded thereon that, when performed on a controller of an analyzer device causes the analyzer device to:
    receive a set of data associated with activity of a logical unit (LUN) of a set of LUNs of a first storage group;
    compare a performance metric value of a performance metric of the set of data, associated with the LUN, to a performance metric threshold associated with the performance metric; and
    when the performance metric value corresponds to the performance metric threshold, categorize the LUN as a candidate for storage on a second storage group, the second storage group being distinct from the first storage group and having a disk type different from that of the first storage group;
    wherein in response to receiving the set of data associated with the activity of the LUN, averaging, by the analyzer device, at least a portion of the set of data over a time period to generate a performance metric value associated with each performance metric.

* * * * *